(12) United States Patent
Tanabe

(10) Patent No.: US 10,215,250 B2
(45) Date of Patent: Feb. 26, 2019

(54) SHOCK ABSORBER

(71) Applicant: HITACHI AUTOMOTIVE SYSTEMS, LTD., Ibaraki (JP)

(72) Inventor: Umi Tanabe, Kawasaki (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/790,436

(22) Filed: Jul. 2, 2015

(65) Prior Publication Data

US 2016/0010715 A1  Jan. 14, 2016

(30) Foreign Application Priority Data

Jul. 11, 2014  (JP) .................................. 2014-143514

(51) Int. Cl.
*F16F 9/38* (2006.01)
*F16F 9/44* (2006.01)
*F16F 9/32* (2006.01)

(52) U.S. Cl.
CPC .............. *F16F 9/38* (2013.01); *F16F 9/3207* (2013.01); *F16F 9/446* (2013.01)

(58) Field of Classification Search
CPC .. F16F 9/325; F16F 9/3207; F16F 9/38; F16F 9/446; F16F 9/464
USPC ..................................................... 188/322.2
See application file for complete search history.

(56) References Cited

U.S. PATENT DOCUMENTS

| 6,112,868 | A * | 9/2000 | Graham | B60G 17/002 188/318 |
| 6,283,259 | B1 * | 9/2001 | Nakadate | F16F 9/325 188/299.1 |
| 6,321,888 | B1 * | 11/2001 | Reybrouck | F16F 9/325 188/299.1 |
| 6,527,093 | B2 * | 3/2003 | Oliver | F16F 9/464 188/315 |
| 2008/0087512 | A1 * | 4/2008 | Vanhees | F16F 9/464 188/322.13 |
| 2009/0242339 | A1 * | 10/2009 | Nakadate | F16F 9/464 188/266.5 |
| 2012/0073918 | A1 * | 3/2012 | Nishimura | B60G 13/06 188/266.2 |
| 2012/0305349 | A1 * | 12/2012 | Murakami | F16F 9/325 188/266.6 |

FOREIGN PATENT DOCUMENTS

| JP | 58-102852 | 7/1983 |
| JP | 2014-62584 | 4/2014 |
| JP | 2014-126194 | 7/2014 |

OTHER PUBLICATIONS

Office Action dated Feb. 28, 2018 in Japanese Application No. 2014-143514, with English translation.

* cited by examiner

Primary Examiner — Melody M Burch
(74) Attorney, Agent, or Firm — Wenderoth, Lind & Ponack, L.L.P.

(57) ABSTRACT

A space between an inner surface of a cover and a housing is set to be wider on a spaced-apart side from a cylinder than on a cylinder side. Therefore, the cover is generally integrated with the housing at the moment that the cylinder side abuts against the housing, which can improve stiffness. This can prevent the cover from contacting a solenoid located on the spaced-apart side of the housing that is spaced apart from the cylinder.

11 Claims, 3 Drawing Sheets

SHOCK ABSORBER

BACKGROUND OF THE INVENTION

1. Technical Field

The present invention relates to a shock absorber including a damping force adjustment mechanism.

2. Description of the Related Art

Conventionally, there has been known a shock absorber including a protection cover attached to a housing protruding from a sidewall of a cylinder (for example, refer to Japanese Utility Model Application Publication No. S58-102852). A damping force adjustable shock absorber including a control valve attached alongside thereto leads to an increase in the length of the housing and the cover that protrudes from the cylinder. Such a shock absorber may be subject to deformation of the cover, and thus contact of the cover with a solenoid of a damping force adjustment mechanism when a bending load is applied to the cover due to an impact with a flying stone or the like.

SUMMARY OF THE INVENTION

The present invention has been developed in consideration of the above-described circumstances, and an object thereof is to provide a shock absorber capable of preventing the cover from contacting the solenoid of the damping force adjustment mechanism.

To achieve the above-described object, according to an aspect of the present invention, a damping force adjustable shock absorber, which is configured to be mounted between two relatively movable members, includes a cylinder sealingly containing hydraulic fluid, a piston disposed or inserted in the cylinder, a piston rod coupled to the piston and extending out of the cylinder, a damping force adjustment mechanism disposed in a housing protruding from a side of the cylinder, and a cover at least partially covering an outer surface of the housing. The damping force adjustment mechanism includes a damping force generation unit, and a solenoid configured to control the damping force generation unit. A space between an inner surface of the cover and the housing is wider on a spaced-apart side from the cylinder than on a cylinder side.

DETAILED DESCRIPTION OF THE INVENTION

One embodiment of the present invention will be described with reference to the accompanying drawings. The present embodiment will be described as a damping force adjustable shock absorber 1 (hereinafter referred to as a "shock absorber 1") including a control valve attached alongside thereto that is used for a semi-active suspension apparatus of a vehicle by way of example. In the following description, a vertical direction in FIG. 1 is defined as a vertical direction (a direction along an axis) of the shock absorber 1 for convenience of the description.

Figure 1:
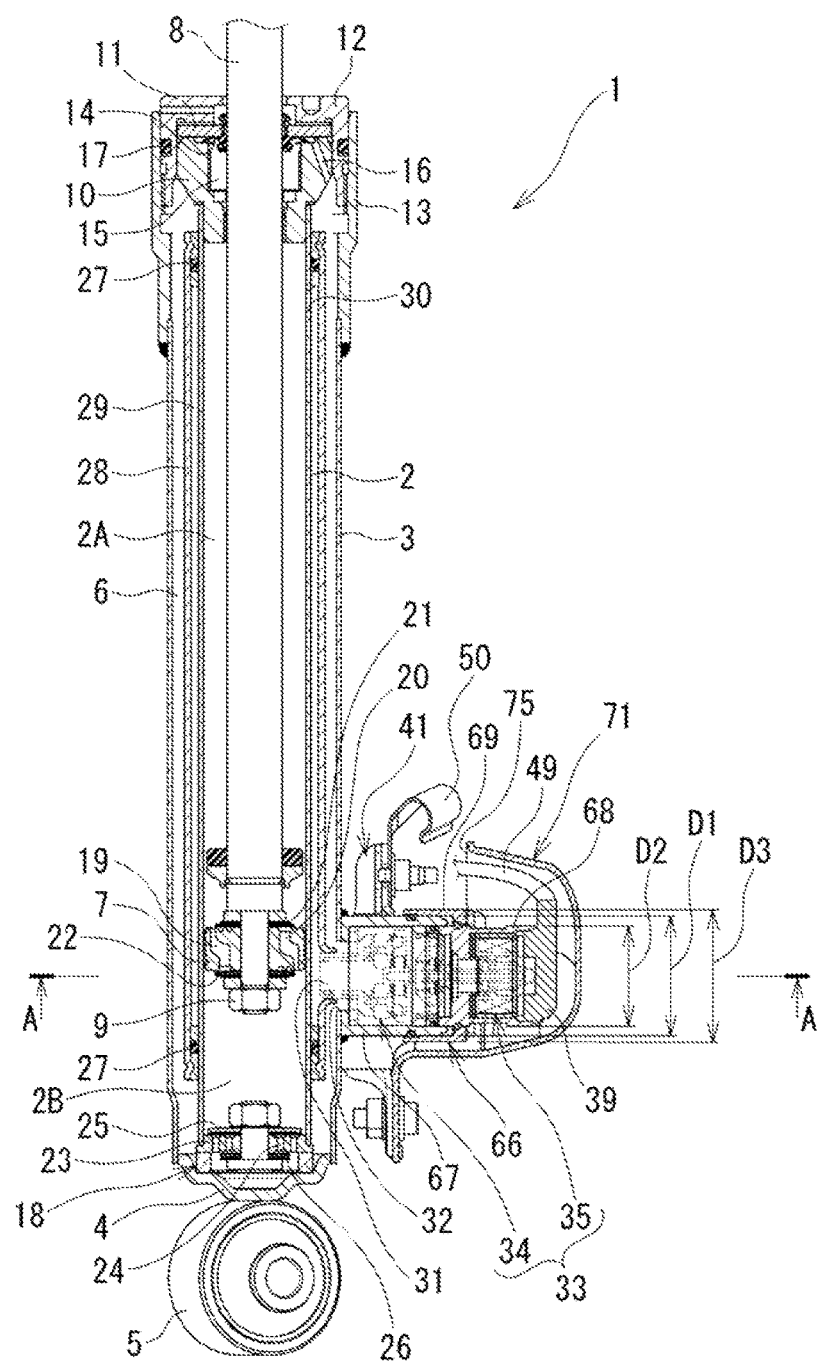
FIG. 1 is a cross-sectional view illustrating a shock absorber according to an embodiment of the present invention that is taken along an axial plane, and in particular, indicating a damping force adjustment mechanism by a virtual line.

As illustrated in FIG. 1, the shock absorber 1 includes an inner tube 2 (a cylinder), and an outer tube 3 disposed outside the inner tube 2. In this manner, the shock absorber 1 has a twin-tube structure having the inner tube 2 and the outer tube 3. The outer tube 3 is closed by a bottom cap 4 joined to a lower end of the outer tube 3. A mounting eye 5 is provided at the bottom cap 4. The mounting eye 5 is attached to a vehicle wheel-side member (for example, a knuckle) of the vehicle. An annular reservoir 6 is formed between the inner tube 2 and the outer tube 3. A piston 7 is slidably fitted to an inner surface of the inner tube 2. The inside of the inner tube 2 is vertically divided into a first chamber 2A and a second chamber 2B by the piston 7.

One end of a piston rod 8 is coupled to the piston 7 by a nut 9. An opposite end side (a cap 12 side in FIG. 1) of the piston rod 8 is inserted through a rod guide 10, a seal member 11, and the cap 12 via the first chamber 2A, and extends out of the inner tube 2. The rod guide 10 is fitted to an upper end of the inner tube 2. The cap 12 is threadably engaged with a generally cylindrical casing 13 joined to an upper end of the outer tube 3. The seal member 11 is formed by baking an elastic member onto a metallic disk, and an outer circumferential portion of the seal member 11 is sandwiched by the rod guide 10 and the cap 12. Further, a lip seal 14 is provided on a lower surface side of the seal member 11. The lip seal 4 is in abutment with the rod guide 10. The lip seal 14 allows oil as hydraulic fluid to flow from a chamber 15 into the reservoir 6 via a return passage 16, and prohibits the oil from flowing in a reverse direction. An O-ring 17 provides a seal between the cap 12 and the casing 13.

A base valve 18 is provided on a lower end of the inner tube 2. The base valve 18 separates the second chamber 2B and the reservoir 6. Passages 19 and 20 are formed through the piston 7. The passages 19 and 20 establish communication between the first chamber 2A and the second chamber 2B. A check valve 21 is provided in the passage 20. The check valve 21 allows only the hydraulic fluid to flow from the second chamber 2B side to the first chamber 2A side. A disk valve 22 is provided in the passage 19. The disk valve 22 opens when a pressure of the hydraulic fluid on the first chamber 2A side reaches a predetermined pressure, and releases the pressure of the hydraulic fluid from the first chamber 2A side to the second chamber 2B side.

Passages 23 and 24 are formed through the base valve 18. The passages 23 and 24 establish communication between the second chamber 2B and the reservoir 6. A check valve 25 is provided in the passage 23. The check valve 25 allows only the hydraulic fluid to flow from the reservoir 6 side to the second chamber 2B side. A disk valve 26 is provided in the passage 24. The disk valve 26 opens when the pressure of the hydraulic fluid on the second chamber 2B side reaches a predetermined pressure, and releases the pressure of the hydraulic fluid from the second chamber 2B side to the reservoir 6 side. The oil as the hydraulic fluid is sealingly contained in the inner tube 2, and the oil and gas are sealingly contained in the reservoir 6.

Both ends of a separator tube 28 are fitted to outer surfaces of the both ends of the inner tube 2 via seal members 27. An annular flow passage 29 is formed between the inner tube 2 and the separator tube 28. The annular flow passage 29 is in communication with the first chamber 2A via a passage 30 formed through a sidewall of the inner tube 2 in the vicinity of the upper end of the inner tube 2. A branch tube 31, which is shaped by burring, is provided on a sidewall of the separator tube 28. The branch tube 31 protrudes from a lower portion of the sidewall of the separator tube 28 in a radial direction of the separator tube 28 (a direction toward a portion where a member 71 is disposed in FIG. 1).

A housing 66 is provided on a sidewall of the outer tube 3. The housing 66 contains a damping force adjustment mechanism 33, which will be described below. The housing 66 includes a generally cylindrical first housing 67, which contains a damping force adjustment valve 34. The first housing 67 has a distal end and a proximal end. The distal end thereof extends from a lower portion of the outer tube 3 toward a radially outer side of the outer tube 3 (in the right direction in FIG. 1). The proximal end thereof is joined to a connection port 32 formed through the sidewall of the outer tube 3. The housing 66 further includes a generally cylindrical second housing 68. The second housing 68 is connected to the distal end of the first housing 67. Then, the second housing 68 contains a solenoid 35. Further, the housing 66 includes a lock nut 69 for fastening the first housing 67 and the second housing 68 to each other.

A grommet 39 for the solenoid is provided on an opening of the second housing 68 on a distal end side thereof (the right side in FIG. 1). The grommet 39 is fixed to the distal end side of the second housing 68 by swaging or crimping. Further, an outer diameter of D1 of the first housing 67 is set to be larger than an outer diameter D2 of the second housing 68. An outer diameter D3 of the lock nut 69 is set to be larger than the outer diameter D1 of the first housing 67 (D3>D1>D2). Further, a thickness of a wall of a portion of the first housing 67 that contains the damping force adjustment valve 34 is set to be thicker than a thickness of a wall of a portion of the second housing 68 that contains the solenoid 35.

The above-described damping force adjustment mechanism 33 includes the damping force adjustment valve 34 (a damping force generation unit) disposed on an inner tube 2 side (a left side in FIG. 1, hereinafter referred to as a "cylinder side"), and the solenoid 35 disposed on a spaced-apart side from the inner tube 2 (the cylinder) (the right side in FIG. 1, hereinafter referred to as a "spaced-apart side from the cylinder"). A conventional configuration can be used for the damping force adjustment mechanism 33 as necessary. Therefore, in the present embodiment, the damping force adjustment mechanism 33 is indicated by a vertical line, and will not be described in detail.

Next, a cover 71 for protecting the damping force adjustment mechanism 33 will be described with reference to FIGS. 2 and 3. The cover 71 is attached to an attachment bracket 41 provided on the sidewall of the outer tube 3. The attachment bracket 41 and the cover 71 are each a metallic part formed by press molding. The attachment bracket 41 has a partially cutout cylindrical shape as illustrated in FIG. 3. The attachment bracket 41 covers a part of the first housing 67 around the first housing 67. Further, the attachment bracket 41 includes a first fixation piece 42, a second fixation piece 43, and a third fixation piece 44 connecting the first fixation piece 42 and the second fixation piece 43 to each other. The first fixation piece 42 and the second fixation piece 43 are disposed on both sides opposite of the first housing 67 from each other in a vertical direction in FIG. 2 (both sides in a radial direction of the outer tube 3).

Figure 2:
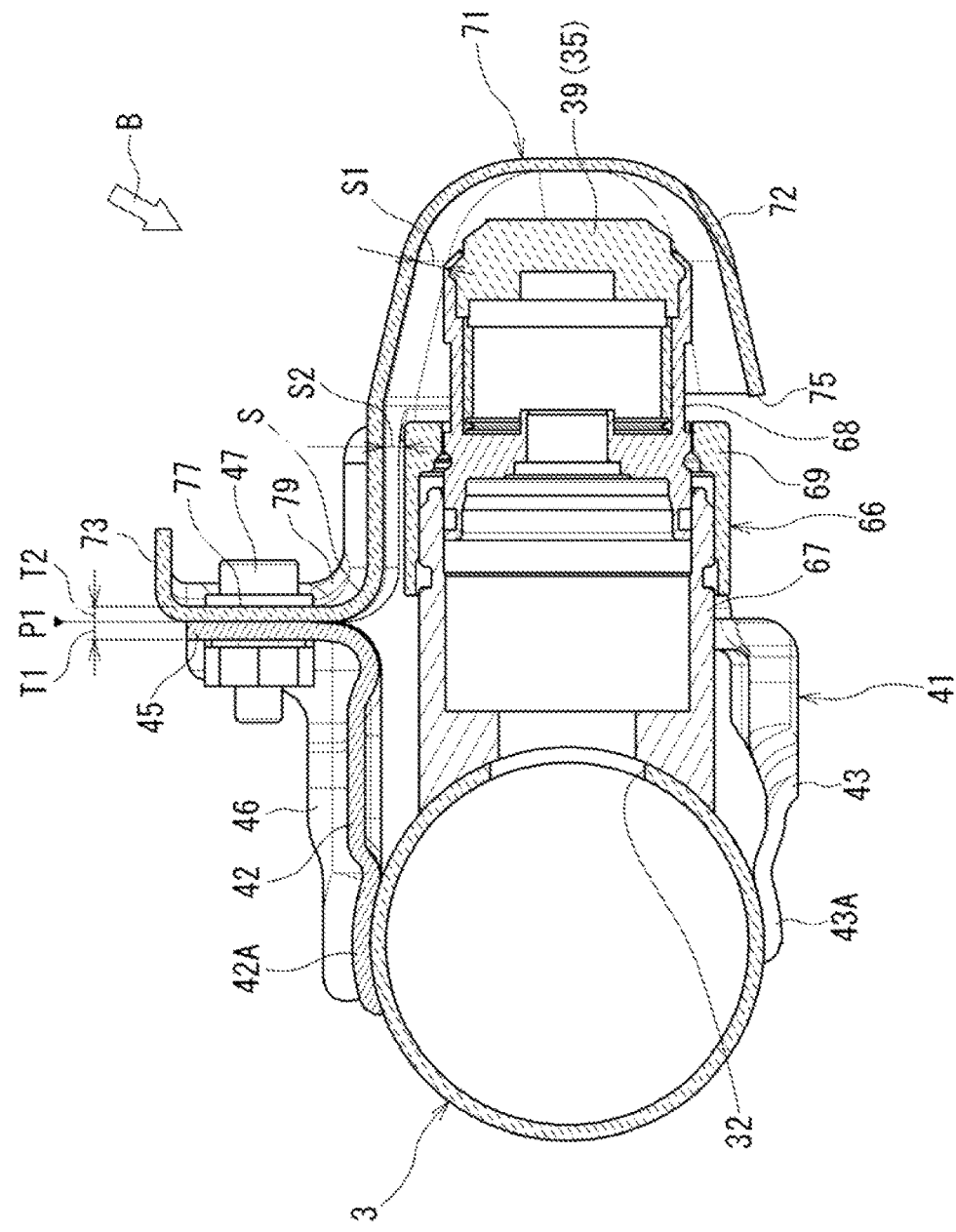
FIG. 2 is a cross-sectional view taken along line A-A in FIG. 1, and in particular, illustrating only an outer tube, a housing, a cover, and an attachment bracket.
Figure 3:
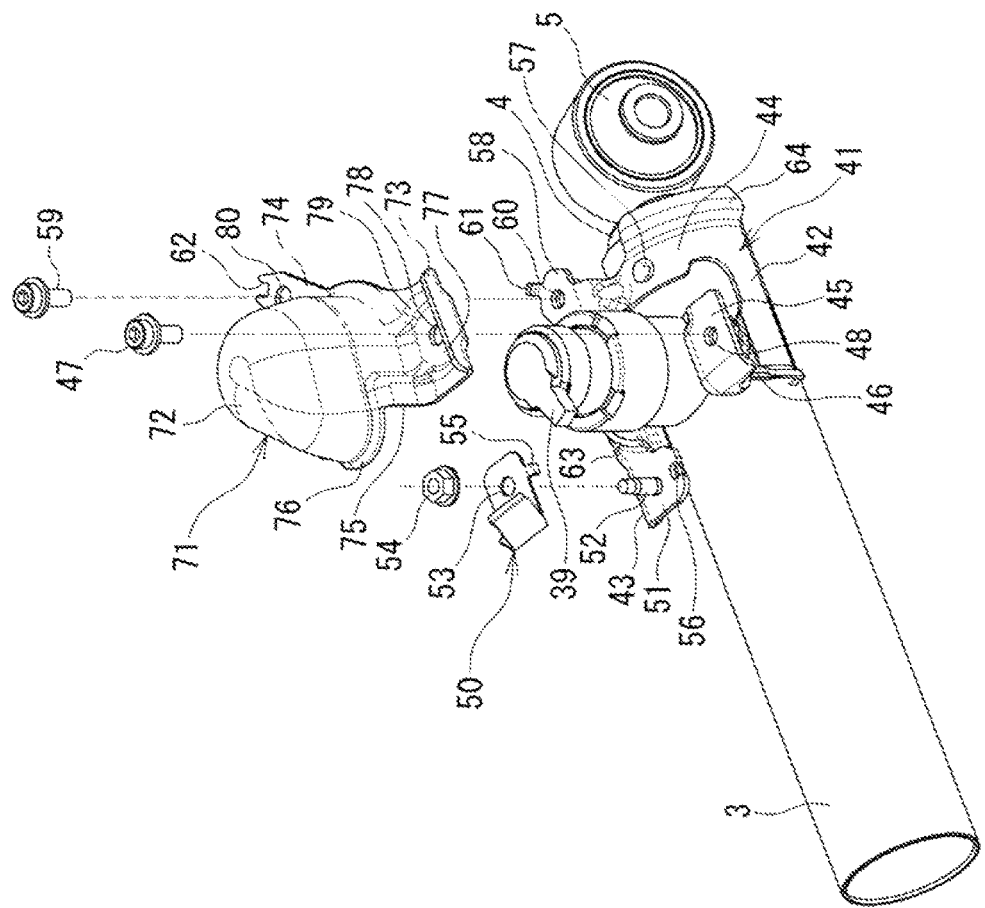
FIG. 3 is an exploded perspective view showing the cover and the outer tube with the attachment bracket joined thereto.

As illustrated in FIG. 2, the first fixation piece 42 has an end 42A, and this end 42A is joined (welded) to the sidewall of the outer tube 3. The first fixation piece 42 includes a first attachment piece 45. The first attachment piece 45 is provided at an end of the first fixation piece 42 on a spaced-apart side from the mounting eye 5 (a left side labeled as reference numeral 3 in FIG. 3). A first attachment stay 73 of the cover 71, which will be described below, is fastened to the first attachment piece 45. Further, a rib 46 is provided at the first fixation piece 42. The rib 46 serves to improve a stiffness of the first attachment piece 45, and thus a strength of attaching the first attachment stay 73 fastened to the first attachment piece 45. A bolt insertion hole 48 is formed through the first attachment piece 45. The bolt insertion hole 48 allows insertion of a bolt 47, which is used to fasten the first attachment stay 73.

The second fixation piece 43 has an end 43A on a left side in FIG. 2, and this end 43A is joined (welded) to the sidewall of the outer tube 3. A second attachment piece 51 is provided at an end of the second fixation piece 43 on the spaced-apart side from the mounting eye 5 (the left side labeled as reference numeral 3 in FIG. 3). A harness clamp 50 is attached to the second attachment piece 51. The harness clamp 50 is used to clamp a harness 49 extending from the grommet 39 (refer to FIG. 1) to the second attachment piece 51. A stud bolt 52 is erected at a generally central portion of the second attachment piece 51. The stud bolt 52 is inserted through a bolt insertion hole 53 formed through the harness clamp 50. The harness clamp 50 is fixed to the second attachment piece 51 by tightening up a nut 54 threadably engaged with the stud bolt 52. Further, a protrusion 55 provided at the harness clamp 50 is engaged with a cutout 56 of the second attachment piece 51, and this engagement forms a mechanism for prohibiting the harness clamp 50 from rotating. This rotation prohibition mechanism prohibits the harness clamp 50 from rotating about the stud bolt 52 relative to the second attachment piece 51.

The third fixation piece 44 is joined to the sidewall of the outer tube 3 by at least one welded portion 57. A third attachment piece 58 is provided at an end of the third fixation piece 44 on the second fixation piece 43 side (refer to FIG. 3). A second attachment stay 74 of the cover 71, which will be described below, is fastened to the third attachment piece 58. Further, a bolt insertion hole 60 is formed through the third attachment piece 58. The bolt insertion hole 60 allows insertion of a bolt 59, which is used to fasten the second attachment stay 74. A protrusion 61 provided at the third attachment piece 58 is engaged with a cutout 62 of the second attachment stay 74, and this engagement forms a mechanism for prohibiting the second attachment stay 74, and thus the cover 71 from rotating. This rotation prohibition mechanism prohibits the cover 71 from rotating about the bolt 59 relative to the attachment bracket 41. Reference numeral 63 indicated in FIG. 3 denotes a burring portion, and reference numeral 64 denotes an enlarged diameter portion, both of which contribute to improved stiffness of the attachment bracket 41.

The cover 71 includes a generally cup-shaped protection portion 72, the above-described first attachment stay 73, and the above-described second attachment stay 74. The protection portion 72 partially covers an outer surface of the lock nut 69, and also covers an outer surface of a portion of the second housing 68 that protrudes from the lock nut 69. The first attachment stay 73 extends from the protection portion 72, and is fastened to the first attachment piece 45 of the attachment bracket 41. The second attachment stay 74 extends from the protection portion 72, and is fastened to the third attachment piece 58 of the attachment bracket 41. The expression "partially cover the outer surface of the lock nut 69" is used herein to mean "covering the outer surface of the lock nut 69 so as to be able to provide protection from damage expected to be incurred while the vehicle is running normally". For example, in a case where the shock absorber 1 is mounted on a right rear wheel of the vehicle, this expression means partially covering the outer surface of the lock nut 69 with the protection portion 72 at least in such a manner that a stone, which has been laid on a road and has been kicked up by the right rear wheel, is prevented from hitting the housing 66 to damage the damping force adjustment mechanism 33.

An opening 75 is formed at a portion of the protection portion 72 of the cover 71 that is located on an upper side where the piston rod 8 extends in FIG. 1 and the left side labeled as reference numeral 3 in FIG. 3. The opening 75 is provided at, for example, a position that at least can prevent the stone, which has been laid on the road and has been kicked up by the right rear wheel, from directly hitting the housing 66, in the case where the shock absorber is mounted on the right rear wheel of the vehicle. Further, the opening 75 is opened so as to surround the harness clamp 50, i.e., so as to prevent the cover 71 from interfering with the harness clamp 50. Further, a rib 76 is formed along a circumferential edge of the opening 75. The rib 76 serves to improve the stiffness of the cover 71.

The first attachment stay 73 includes a seat portion 77, which receives the bolt 47 and abuts against (is fastened to) the first attachment piece 45 of the attachment bracket 41. A bolt insertion hole 78 is formed through a center of the seat portion 77. The bolt insertion hole 78 allows insertion of the above-described bolt 47. Further, a sidewall 79 is formed along a circumference of the seat portion 77. The sidewall 79 serves to improve the stiffness of the first attachment stay 73. In other words, the first attachment stay 73 includes the seat portion 77 formed at a recessed bottom. The second attachment stay 74 extends toward an opposite side from the first attachment stay 73 in such a manner that the first attachment stay 73 and the second attachment stay 74 radially extend over the outer tube 3. A bolt insertion hole 80 is formed through the second attachment stay 74. The bolt insertion hole 80 allows insertion of the above-described bolt 59.

As illustrated in FIG. 2, a plate thickness T1 of the attachment bracket 41 is set to be larger than a plate thickness T2 of the cover 71 (T1>T2). In other words, the attachment bracket 41 has a stiffness, in particular, a strength against a bending load set to be higher than the cover 71. Further, a surface P1 on which the attachment piece 45 of the attachment bracket 41 and the first attachment stay 73 of the cover 71 are fastened to each other is positioned on the cylinder side with respect to an end of the lock nut 69 on the cylinder side. This can prevent a tightening tool from interfering with the attachment bracket 41 before the cover 71 is attached, when the lock nut 69 is tightened up.

As illustrated in FIG. 2, a space between an inner surface of the cover 71 and the housing 66 is wider on the spaced-apart side from the cylinder (a distance S1 in FIG. 2) than on the cylinder side (a distance S2 in FIG. 2) (S1>S2). In other words, a minimum space between the inner surface of the cover 71 and the housing 66 is the space (the distance S2) between the cylinder side of the cover 71 and the lock nut 69.

Next, an operation of the shock absorber 1 according to the present embodiment will be described.

The shock absorber 1 corresponds to a part of the semi-active suspension apparatus of the vehicle, and is vertically mounted between two members, a vehicle body-side member and the vehicle wheel-side member of the vehicle. More specifically, the shock absorber 1 is mounted in such a manner that a distal end of the piston rod 8 on the opposite end side, and the mounting eye 5 are connected to the vehicle body-side member and the vehicle wheel-side member of the vehicle, respectively. The shock absorber 1 is configured to correspond to the right rear wheel of the vehicle, and is mounted on the vehicle in such a manner that the housing 66 (the damping force adjustment mechanism 33) protrudes in a direction of ten o'clock as a clock position, although the present invention is not limited to this configuration.

During extension or compression of the piston rod 8 of the shock absorber 1 while the vehicle is running, the damping force adjustment mechanism 33 controls a flow rate of the oil flowing from the annular flow passage 29 to the reservoir 6 by the damping force adjustment valve 34 (the damping force generation unit), thereby generating a damping force. Further, the damping force adjustment mechanism 33 adjusts a valve-opening pressure of the damping force adjustment valve 34 by the solenoid 35, thereby adjusting the damping force to be generated variably (in a stepwise manner or in a non-stepwise manner).

The shock absorber 1 mounted on the right rear wheel side of the vehicle in the above-described manner is subject to the stone flying from a B direction in FIG. 2, which has been laid on the road and kicked up by the right rear wheel (hereinafter referred to as the "flying stone") while the vehicle is running. Then, the present embodiment can protect the damping force adjustment mechanism 33 contained in the housing 66 from the flying stone by the cover 71 at least partially covering the housing 66.

According to the present embodiment, the space between the inner surface of the cover 71 and the housing 66 is set to be wider on the spaced-apart side from the cylinder than on the cylinder side (the base side of the cover 71). In other words, the minimum space between the inner surface of the cover 71 and the housing 66 is the space between the cylinder side of the cover 71 and the lock nut 69. Further, the plate thickness of the attachment bracket 41 is set to be thicker than the plate thickness of the cover 71, by which the stiffness of the attachment bracket 41 is set to be higher than the stiffness of the cover 71. Further, the cover 71 is made of metal, which can improve the strength of the cover 71, and thus a performance for protecting the damping force adjustment mechanism 33 compared to a cover made of plastic.

According to this configuration, for example, when a flying stone hits the cover 71, the cover 71 having the lower stiffness is deformed so as to rotate about a supporting point S of the cover 71 (a supporting point when the cover 71 is deformed in response to a force applied to the distal end of the cover 71) in a clockwise direction in FIG. 2 while being fixed at the points where the cover 71 is fastened to the attachment bracket 41 (the first attachment piece 45 and the third attachment piece 58). As a result, the cylinder side of the cover 71 is brought into abutment with the lock nut 69 (the housing 66). In other words, the space between the cylinder side of the cover 71 and the lock nut 69 (the housing 66) falls to zero (S2=0). At this time, a predetermined space is maintained between the spaced-apart side of the cover 71 that is spaced apart from the cylinder, and the housing 66 (S1>0). In this manner, when the cover 71 is deformed so as to rotate around the supporting point S (rotationally deformed), the cover 71 is first brought into abutment with the lock nut 69. When the cover 71 is in abutment with the lock nut 69, the cover 71 is out of abutment with the distal end side of the housing 66, in particular, the grommet 39 for the solenoid. The shape of the cover 71 under a normal situation (before the deformation) is determined so as to establish such a relationship.

Further, the cover 71 is generally integrated with the housing 66 at the moment that the cylinder side of the cover 71 is brought into abutment with the lock nut 69, so that the deformable portion of the cover 71 is decreased, which can improve the stiffness, in particular, the strength against the bending load in a predetermined direction. This allows the cover 71 to maintain the sufficient strength against the bending load expectable to be applied while the vehicle is running normally, and to exert the sufficient protection performance even when being attached at fewer points (the two points, the first attachment piece 45 and the third attachment piece 58 in the present embodiment). As a result, the solenoid 35 can be prevented from being damaged, which otherwise might be caused due to abutment of the cover 71 with the spaced-apart side of the housing 66 that is spaced apart from the cylinder (the distal end of the second housing 68), and thus application of a load (a bending moment) onto the damping force adjustment mechanism 33.

Therefore, even when the damping force adjustment mechanism 33 (the housing 66) protrudes from the outer tube 3 by a relatively long length, the cover 71 is generally integrated with the housing 66 at the moment that the cylinder side of the cover 71 is brought into abutment with the lock nut 69, so that the cover 71 becomes less deformable, whereby the cover 71 does not have to achieve, by itself, the stiffness (the strength) against the bending load in the predetermined direction that is expected to be applied while the vehicle is running normally. Accordingly, compared to a configuration that requires the cover 71 to achieve the stiffness (the strength) by itself, the plate thickness of the cover 71 can be designed to be thinner, which can lead to a reduction in the weight of the cover 71 and thus the weight of the shock absorber 1, and a reduction in manufacturing cost.

The present invention can be configured in the following manner.

In the above-described embodiment, the minimum space between the inner surface of the cover 71 and the housing 66 is the space between the cylinder side of the cover 71 and the lock nut 69, but this minimum space should be interpreted to include zero (S2=0). In other words, the cover 71 can be configured in such a manner that the cylinder side of the cover 71 is fitted to the outer surface of the lock nut 69.

In this case, the cover 71 can be easily positioned relative to the housing (the lock nut 69), which can make the manufacturing process more efficient.

Further, in the above-described embodiment, the first housing 67 and the second housing 68 are fastened to each other by the lock nut 69, thereby forming the housing 66. However, the first housing 67 and the second housing 68 can be joined to each other by swaging or crimping, thereby forming the housing 66.

In this case, the space (S2) on the cylinder side between the inner surface of the cover 71 and the housing 66 can be the space between the inner surface of the cylinder side of the cover 71 and the outer surface of the first housing 67.

Employing the metallic cover 71 can improve the strength, and thus the performance for protecting the damping force adjustment mechanism 33 compared to the plastic cover, but the plastic cover may be employed in a case where, for example, the damping force adjustment mechanism 33 is located high above the ground or located at such a position that a flying stone cannot easily hit the cover 71.

According to the embodiments stated above, the cover can be prevented from contacting the solenoid in the damping force adjustment mechanism.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2014-143514 filed on Jul. 11, 2014.

The entire disclosure of Japanese Patent Application No. 2014-143514 filed on Jul. 11, 2014 including specification, claims, drawings and summary are incorporated herein by reference in its entirety.

What is claimed is:

1. A damping force adjustable shock absorber configured to be mounted between two relatively movable members, the damping force adjustable shock absorber comprising:
 a cylinder sealingly containing hydraulic fluid;
 a piston disposed in the cylinder;
 a piston rod coupled to the piston and extending out of the cylinder;
 a damping force adjustment mechanism disposed in a housing, the housing protruding in a direction away from a side of the cylinder, the housing having an outer surface that is exposed outside of the cylinder; and
 a cover at least partially covering the outer surface of the housing,
 wherein the damping force adjustment mechanism includes a damping force generation unit, and a solenoid that is provided in a spaced-apart side spaced apart from the cylinder and that is configured to control the damping force generation unit,
 wherein the cover is directly or indirectly fastened to the cylinder,
 wherein a space is provided between an inner surface of the cover and the housing over the entire inner surface of the cover,
 wherein the cover is fastened to the cylinder so as to be rotationally deformable around a supporting point of the cover relative to the housing,
 wherein the space between the inner surface of the cover and the outer surface of the housing is wider in the spaced-apart side away from the cylinder than in a cylinder side close to the cylinder,
 wherein the damping force generation unit is disposed on the cylinder side, and the solenoid is disposed on the spaced-apart side from the cylinder, and
 wherein the cover is out of contact with the solenoid when the cover is in contact with the housing by rotational deformation of the cover about the supporting point.

2. The shock absorber according to claim 1, wherein the housing includes a first housing containing the damping force generation unit, a second housing containing the solenoid, and a lock nut fastening the first housing and the second housing to each other, and
 wherein a space between the cover and the lock nut is minimized.

3. The shock absorber according to claim 2, wherein the cover is shaped in such a manner that the cover is out of contact with the second housing when the cover is in contact with the lock nut by rotational deformation of the cover about the supporting point.

4. The shock absorber according to claim 1, wherein the cover is made of metal.

5. A damping force adjustment apparatus for a damping force adjustable shock absorber configured to be mounted between two relatively movable members, the shock absorber including an inner tube, and an outer tube disposed outside the inner tube, the damping force adjustment apparatus comprising:

a housing protruding in a direction away from a side of the outer tube, the housing having an outer surface that is exposed outside of the shock absorber;

a damping force adjustment mechanism disposed in the housing; and a cover at least partially covering the outer surface of the housing, wherein the cover includes a spaced-apart portion spaced apart from a cylinder of the damping force adjustable shock absorber, and a cylinder-side portion, the cylinder-side portion being located closer to the cylinder of the damping force adjustable shock absorber than the spaced-apart portion of the cover, and wherein the cover is configured in such a manner that the cylinder-side portion can abut against the outer surface of the housing when an external force is applied to the cover, wherein a first space between the spaced-apart portion of the cover and the outer surface of the housing is wider than a second space between the cylinder-side portion of the cover and the outer surface of the housing, so that the spaced-apart portion does not abut against the outer surface of the housing, wherein the damping force adjustment mechanism includes a damping force generation unit and a solenoid configured to control the damping force generation unit, and the damping force generation unit is disposed in the cylinder-side portion and the solenoid is disposed in the spaced-apart portion, wherein the housing includes a first housing containing the damping force generation unit, a second housing containing the solenoid, and a lock nut fastening the first housing and the second housing to each other, wherein the second space is formed between the cover and the lock nut, and wherein the cover is shaped in such a manner that the cover is out of contact with the second housing when the cover is in contact with the lock nut by a rotational deformation of the cover about a supporting point near a point at which the cover is fixed.

6. The damping force adjustment apparatus according to claim 5, wherein a grommet for the solenoid is fixed to a distal end side of the second housing, and wherein the cover covers at least a distal end portion of the grommet.

7. The shock absorber according to claim 1, wherein a grommet for the solenoid is fixed to a distal end side of the housing, and the cover covers at least a distal end portion of the grommet.

8. The shock absorber according to claim 1, comprising an outer tube disposed outside the cylinder, and an attachment bracket provided on a sidewall of the outer tube, wherein the cover includes one side that is attached to the bracket.

9. The shock absorber according to claim 8, wherein a side of the cover opposite from the side attached to the bracket is formed into a generally cup-shaped protection portion that covers an outer surface of a portion of the housing, and the solenoid is disposed in the cup-shaped protection portion.

10. The shock absorber according to claim 1, wherein the cover includes a fixation portion fixed to a cylinder side and a protection portion extending from the fixation portion through a supporting point to partially cover an outer surface side of the solenoid, and wherein the solenoid is positioned so as not to abut against the cover when the cover is deformed around the supporting point and in abutment with the damping force generation unit, and wherein the cover is fixed to an attachment bracket disposed on the cylinder at a plurality of points.

11. The shock absorber according to claim 1, wherein the cover is fixed to an attachment bracket disposed on the cylinder at a plurality of points.

* * * * *